(12) United States Patent
Li

(10) Patent No.: US 11,667,155 B2
(45) Date of Patent: Jun. 6, 2023

(54) PNEUMATIC TIRE FOR HEAVY DUTY

(71) Applicant: Sumitomo Rubber Industries, Ltd., Kobe (JP)

(72) Inventor: Qingmao Li, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/742,740

(22) Filed: May 12, 2022

(65) Prior Publication Data

US 2022/0388343 A1    Dec. 8, 2022

(30) Foreign Application Priority Data

Jun. 2, 2021  (JP) .............................. JP2021-093162

(51) Int. Cl.
*B60C 11/03*  (2006.01)
*B60C 9/08*   (2006.01)
*B60C 11/12*  (2006.01)
*B60C 9/20*   (2006.01)

(52) U.S. Cl.
CPC ............ *B60C 9/08* (2013.01); *B60C 11/1236* (2013.01); *B60C 9/2006* (2013.01); *B60C 2011/0341* (2013.01); *B60C 2200/06* (2013.01)

(58) Field of Classification Search
CPC ..... B60C 2011/0341; B60C 2011/0339; B60C 2011/0348; B60C 11/0318; B60C 11/0311; B60C 11/0309; B60C 11/0306; B60C 11/03
See application file for complete search history.

(56) References Cited

U.S. PATENT DOCUMENTS

| | | | |
|---|---|---|---|
| 3,556,190 A * | 1/1971 | Riches | B60C 11/0309 |
| | | | 152/209.27 |
| 2018/0222255 A1* | 8/2018 | Maehara | B60C 3/04 |
| 2021/0370723 A1* | 12/2021 | Fukuda | B60C 11/0306 |
| 2022/0097461 A1* | 3/2022 | Hayashi | B60C 11/0306 |

FOREIGN PATENT DOCUMENTS

| | | | | |
|---|---|---|---|---|
| EP | 2033814 B1 * | 3/2015 | | B60C 9/185 |
| EP | 3 711 978 A1 | 9/2020 | | |
| JP | 2020-152136 A | 9/2020 | | |

* cited by examiner

*Primary Examiner* — Cedrick S Williams
(74) *Attorney, Agent, or Firm* — Birch, Stewart, Kolasch & Birch, LLP

(57) ABSTRACT

A pneumatic tire for heavy duty having an aspect ratio of 65% or less includes a carcass and a belt layer. A tread portion includes circumferential grooves. The circumferential grooves include a pair of shoulder circumferential grooves and a crown circumferential groove. The crown circumferential groove 11 is a narrow groove and each of the shoulder circumferential grooves is a wide groove. The belt layer includes metal belt cords inclined with respect to a tire circumferential direction. The belt layer has outer ends each positioned outside a respective one of the shoulder circumferential grooves in a tire axial direction. A belt half width is 55% or more and 85% or less of a carcass half width.

17 Claims, 4 Drawing Sheets

PNEUMATIC TIRE FOR HEAVY DUTY

RELATED APPLICATIONS

This application claims the benefit of foreign priority to Japanese Patent Applications No. JP2021-093162, filed Jun. 2, 2021, which are incorporated by reference in its entirety.

FIELD OF THE INVENTION

The present disclosure relates to a pneumatic tire for heavy duty.

BACKGROUND OF THE INVENTION

Conventionally, various tires for heavy duty having a small aspect ratio have been proposed. For example, Patent Document 1 shown below has proposed a pneumatic tire for heavy duty with a small aspect ratio of 65 or less as indicated. By specifying the positioning of shoulder circumferential grooves, a belt, and edge bands, this pneumatic tire for heavy duty is expected to improve uneven wear resistance performance while maintaining formability.

PRIOR ART

Patent Document

[Patent Document 1]
Japanese Unexamined Patent Application Publication No. 2020-152136

SUMMARY OF THE INVENTION

Problems to be Solved by the Invention

In general, pneumatic tires for heavy duty tend to grow in outer diameter due to degradation from use. In particular, pneumatic tires for heavy duty having an aspect ratio of 65% or less tend to have uneven wear in the tread portions due to a large difference in an amount of an outer diameter growth between areas near tread edges and an area near a tire equator of the tread portion. On the other hand, in the aforementioned pneumatic tires for heavy duty, attempts to improve the uneven wear resistance performance tend to sacrifice rolling resistance and wet performance.

The present disclosure was made in view of the above, and a primary object thereof is to provide a pneumatic tire for heavy duty having the aspect ratio of 65% or less capable of improving the uneven wear resistance performance without sacrificing the rolling resistance and the wet performance.

Means Tor Solving the Problems

The present disclosure is a pneumatic tire for heavy duty having an aspect ratio of 65% or less including:
a tread portion:
a pair of bead portions;
a carcass extending from one of the bead portions to the other one of the bead portions via the tread portion; and
a belt layer arranged inside the tread portion,
wherein
the tread portion includes a plurality of circumferential grooves extending continuously in a tire circumferential direction,
the circumferential grooves include a pair of shoulder circumferential grooves and at least one crown circumferential groove arranged between the shoulder circumferential grooves,
the crown circumferential groove is a narrow groove that closes when contacting the ground under a condition of being loaded with a maximum tire load,
each of the shoulder circumferential grooves is a wide groove that does not close when contacting the ground under the condition of being loaded with the maximum tire load,
the belt layer includes a plurality of belt cords made of metal and arranged obliquely with respect to the tire circumferential direction,
a pair of outer ends in a tire axial direction of the belt layer are each positioned axially outside a respective one of the shoulder circumferential grooves,
a belt half width from a tire equator to one of the outer ends of the belt layer is 55% or more and 85% or less of a carcass half width, the carcass half width being a distance in the tire axial direction from the tire equator to the carcass at a maximum tire width position in an axial half of the tire.

Effects of the Invention

By adopting the above configuration, it is possible that the pneumatic tire for heavy duty of the present disclosure improves the uneven wear resistance performance without sacrificing the rolling resistance and the wet performance.

DETAILED DESCRIPTION OF THE INVENTION

Figure 1:
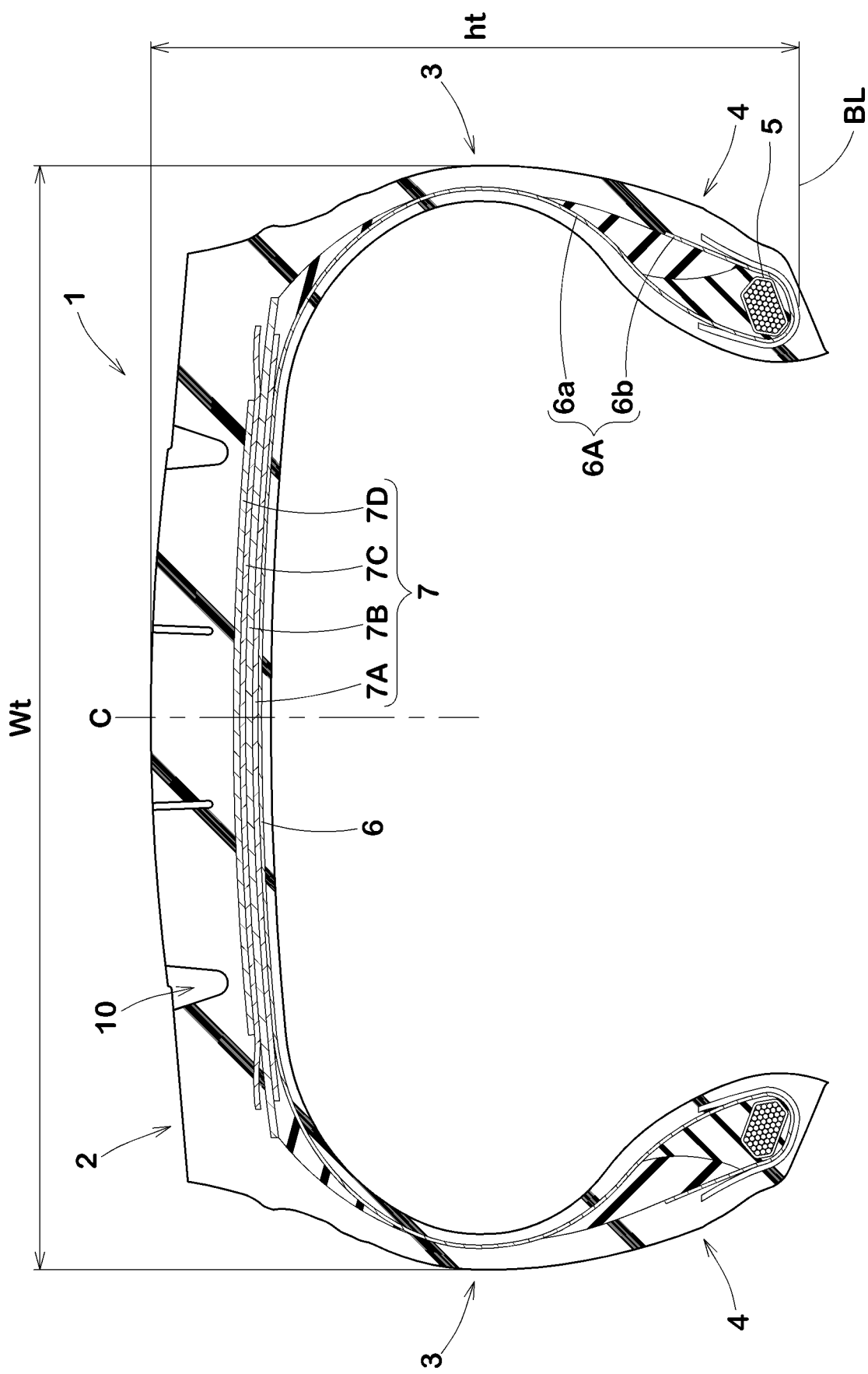
FIG. 1 is a cross-sectional view of the pneumatic tire for heavy duty according to an embodiment of the present disclosure.

An embodiment of the present disclosure will now be described in conjunction with accompanying drawings. FIG. 1 is a tire meridian section passing through a tire rotational axis of a pneumatic tire for heavy duty (hereinafter, may be simply referred to as "tire") 1 in a standard state. The tire 1 of the present embodiment is used for a small truck, a bus, and the like, for example.

The above-mentioned "standard state" is a state in which the tire 1 is mounted on a standard rim (not shown), inflated to a standard inner pressure, and loaded with no tire load. In the case of tires for which various standards are not specified, the above-mentioned standard state means a state of standard use of the tire according to the intended purpose of use of the tire and being loaded with no tire load. In the present specification, unless otherwise noted, the dimensions and the like of various parts of the tire are values measured in the standard state. In the case of components inside the tire, dimensions and the like thereof refer to the dimensions in a state where the shape of the tire cross section is substantially the same as the shape of the tire in the standard state described above.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

As shown in FIG. 1, the tire 1 of the present disclosure has an aspect ratio of 65% or less. The aspect ratio is the ratio of a tire cross-sectional height (ht) to a tire cross-sectional width (Wt) in the standard state described above. It should be noted that if minute convex portions indicating patterns, letters, and the like are arranged on sidewall portions 3, the tire cross-sectional width (Wt) is measured excluding the aforementioned convex portions. Further, the tire cross-sectional height (ht) is the maximum height of the tire cross-section measured from a bead baseline BL. The bead baseline BL is a tire axial line passing through a rim diameter position of the rim on which the tire 1 is mounted.

The tire 1 includes a tread portion 2, the sidewall portions 3 arranged continuously to the tread portion 2 on both sides thereof in a tire axial direction, and bead portions 4 each arranged continuously to a respective one of the sidewall portions on an inner side in a tire radial direction.

Figure 2:
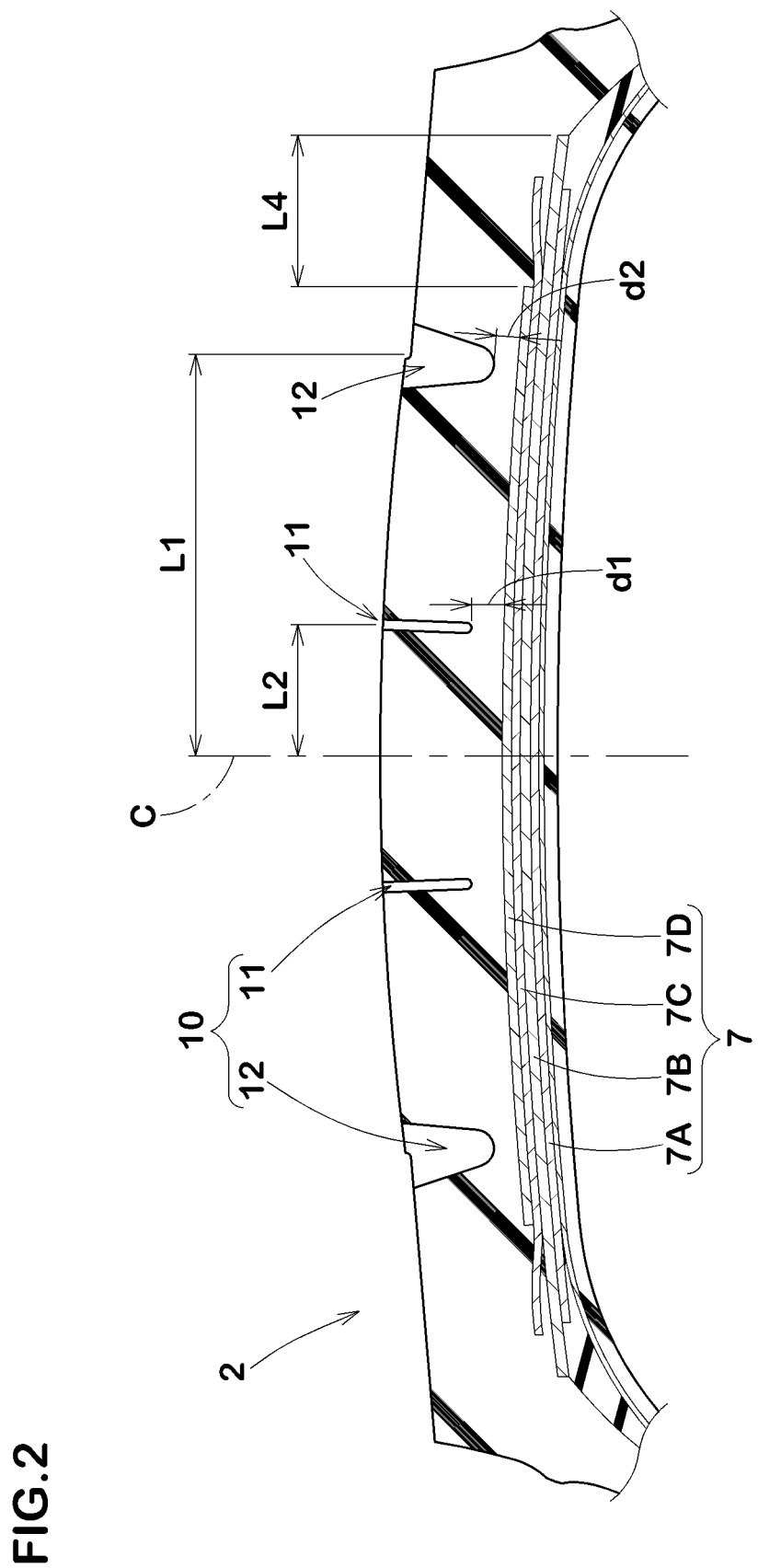
FIG. 2 is an enlarged view of the tread portion of FIG. 1.

FIG. 2 shows an enlarged cross-sectional view of the tread portion 2. As shown in FIG. 2, the tread portion 2 includes a plurality of circumferential grooves 10 extending continuously in a tire circumferential direction. The circumferential grooves 10 includes a pair of shoulder circumferential grooves 12 and at least one crown circumferential groove 11 provided between the pair of the shoulder circumferential grooves 12. In the present embodiment, two crown circumferential grooves 11 are provided between the pair of the shoulder circumferential grooves 12 so as to sandwich a tire equator (C).

The crown circumferential grooves 11 are each configured as a narrow groove that closes when contacting the ground under the condition of being loaded with a maximum tire load. On the other hand, each of the pair of the shoulder circumferential grooves 12 is configured as a wide groove that does not close when contacting the ground when the tire is mounted on a vehicle loaded with the maximum tire load. In the case of pneumatic tires for which various standards have been established, the above term "maximum tire load" means the maximum tire load specified for each tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. In the case of tires for which the various standards are not specified, the maximum tire load means the maximum tire load under which the tire can continue to run.

As shown in FIG. 1, the tire 1 includes a carcass 6 and a belt layer 7 arranged inside the tread portion. The carcass 6 extends from one of the bead portions 4 to the other one of the bead portions 4 via one of the sidewall portions 3, the tread portion 2, and the other one of the sidewall portions 3.

The carcass 6 includes one carcass ply 6A, for example. The carcass 6 may be composed of a plurality of carcass ply 6A, for example. The carcass ply 6A consists of steel carcass cords arranged at an angle of 70 degrees or more and 90 degrees or less with respect to the tire circumferential direction, for example.

The carcass ply 6A has a main body portion (6a) and turned-up portions (6b). The main body portion (6a) extends between the pair of the bead portions 4. The turned portions (6b) are connected with the main body portion (6a) and each turned up from inside to outside in the tire axial direction around a respective one of bead cores 5.

The belt layer 7 is arranged radially outside the carcass 6 in the tread portion 2, for example. The belt layer 7 includes belt cords made of metal and arranged obliquely with respect to the tire circumferential direction. Further, a pair of axially outer ends of the belt layer are each positioned axially outside a respective one of the shoulder circumferential grooves 12.

Figure 3:
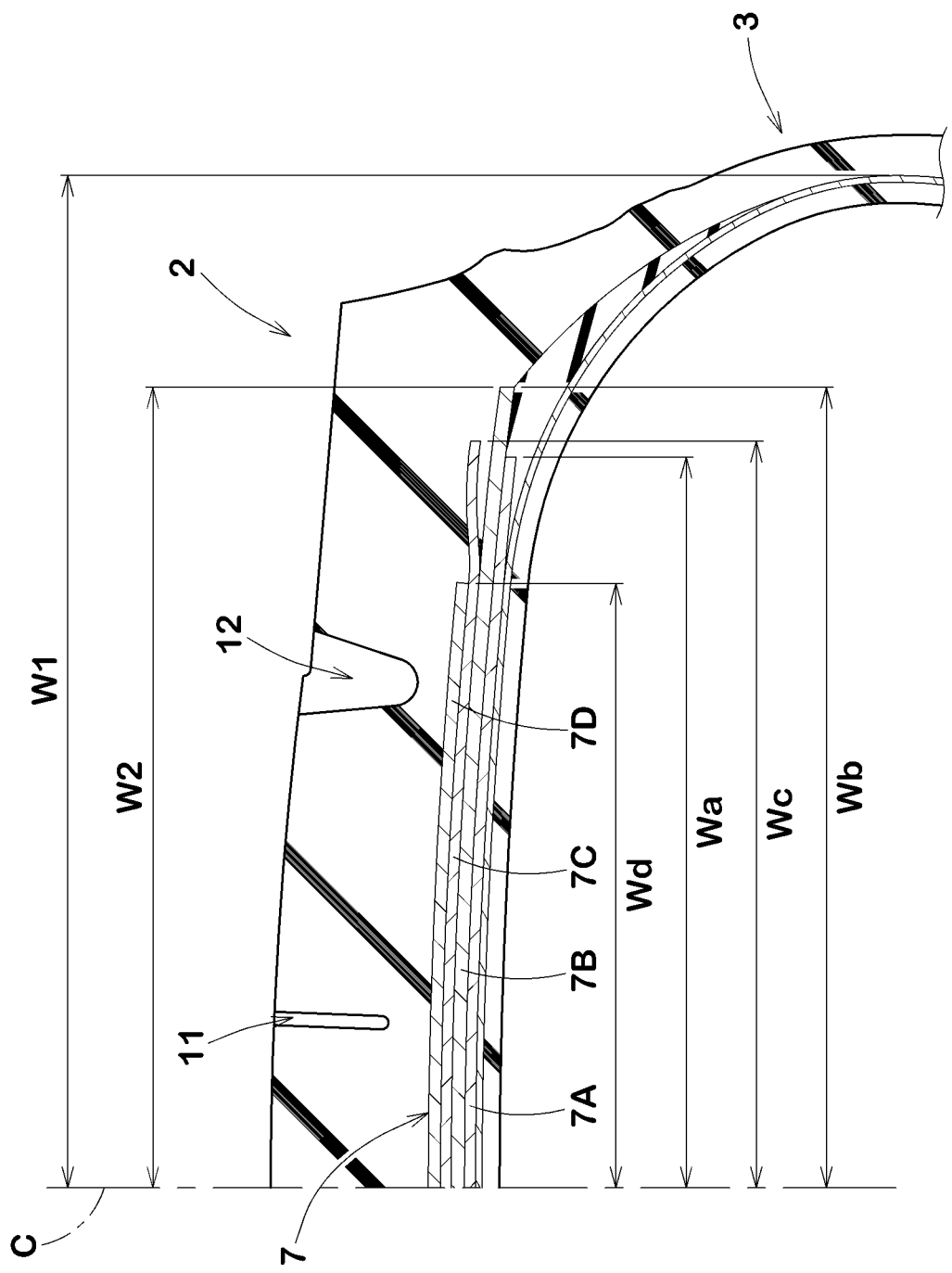
FIG. 3 is an enlarged view of a part of one of sidewall portions and a half of the tread portion of FIG. 1.

FIG. 3 shows an enlarged view of a portion of one of the sidewall portions 3 and a half of the tread portion 2. As shown in FIG. 3, a belt half width W2 from the tire equator (C) to one of the outer ends of the belt layer 7 is 55% or more and 85% or less of a carcass half width W1. The carcass half width W1 is the distance in the tire axial direction from the tire equator (C) to the carcass 6 at a maximum tire width position in an axial half of the tire 1. In the present disclosure, by adopting the above configuration, it is possible that the uneven wear resistance performance is improved without sacrificing the rolling resistance and the wet performance. The reason for this is presumed to be the following mechanism.

In the present disclosure, since the crown circumferential groove 11 is the above-mentioned narrow groove, the rigidity of the central portion of the tread portion 2 is maintained, therefore, it is possible that the increase in the rolling resistance is suppressed. On the other hand, since the shoulder circumferential grooves 12 are the above-mentioned wide grooves, the wet performance is ensured.

In general, pneumatic tires for heavy duty with an aspect ratio of 65% or less tend to have a large difference in the amount of the outer diameter growth due to degradation during running because of a large difference in a binding force of the belt layer 7 between the vicinities of the tread edges of the tread portion 2 and the vicinity of the tire equator. In the present disclosure, the belt half width W2 is specified to be 55% or more and 85% or less of the carcass half width W1, therefore, it is possible that the amount of the outer diameter growth of each part of the tread portion 2 is made uniform, thereby, it is possible that the uneven wear resistance performance is improved. In the present disclosure, it is considered that such a mechanism can improve the uneven wear resistance performance without sacrificing the rolling resistance and the wet performance.

A more detailed configuration of the present embodiment will now be described below. It should be noted that each of the configurations described below is a specific form of the present embodiment. Therefore, it goes without saying that the present disclosure can exert the above-described effects even if it does not have the configurations described below. Further, even if any one of the configurations described below is independently applied to the tire of the present disclosure having the above-mentioned characteristics, improvement in performance according to each configuration can be expected. Furthermore, when some of the configurations described below are applied in combination, combined improvements in performance can be expected according to each of the applied configurations.

The belt half width W2 is preferably 60% or more, more preferably 65% or more, and preferably 80% or less, and more preferably 75% or less of the carcass half width W1.

Thereby, it is possible that the uneven wear resistance performance is improved while the increase in the rolling resistance is suppressed.

The belt layer 7 incudes a plurality of belt plies overlaid in the tire radial direction. The belt layer 7 of the present embodiment includes a first belt ply 7A, a second belt ply 7B, a third belt ply 7C, and a fourth belt ply 7D layered in this order from inside to outside in the tire radial direction. In other words, the belt layer 7 in the present embodiment is composed of four belt plies. One belt ply includes a plurality of the belt cords arranged obliquely to the same side with respect to the tire circumferential direction, i.e., in each of the belt plies, the belt cords are arranged obliquely to the same side with respect to the tire circumferential direction. Further, at least one pair of the belt plies adjacent to each other in the tire radial direction are overlaid so that the belt cords of one of the belt plies intersect with the belt cords of the other one of the belt plies. It is possible that the belt layer 7 configured as such effectively reinforces the tread portion 2.

It is preferred that the belt cords included in the first belt ply 7A have an angle with respect to the tire circumferential direction larger than each of angles of the belt cords included in the second to fourth belt plies 7B to 7D with respect to the tire circumferential direction. The arrangement of the belt cords configured as such helps to reduce conicity and increase straight running stability.

The angle of the belt cords included in the first belt ply 7A with respect to the tire circumferential direction is preferably 40 degrees or more, more preferably 45 degrees or more, and preferably 60 degrees or less, more preferably 55 degrees or less.

The angles of the belt cords included in the second to fourth belt plies 7B to 7D with respect to the tire circumferential direction are each preferably 10 degrees or more, more preferably 12 degrees or more, and preferably 25 degrees or less, more preferably 22 degrees or less. It is possible that the second to fourth belt plies 7B to 7D configured as such exert an excellent tread reinforcing effect while maintaining the conicity small.

In the present embodiment, the outer ends of each of the first to fourth belt plies 7A to 7D are located axially outside the shoulder circumferential grooves 12. Further, at least the ply half widths from the tire equator to the ply outer ends in the tire axial direction of the second to fourth belt plies 7B to 7D are each 110% or more and 170% or less of a distance L1 (shown in FIG. 2) in the tire axial direction from the tire equator to a groove center of each of the shoulder circumferential grooves 12. In a preferred embodiment, the ply half width of the first belt ply 7A is also within the range described above. It is possible that the belt layer 7 including the belt plies configured as such reliably suppresses the outer diameter growth near the tread edges while suppressing the increase in the rolling resistance.

A first belt half width (Wa), which is the belt half width of the first belt ply 7A, is 65% or more and 80% or less of the carcass half width W1, for example. A second belt half width (Wb), which is the belt half width of the second belt ply 7B, is 75% or more and 85% or less of the carcass half width W1, for example. A third belt half width (Wc), which is the belt half width of the third belt ply 7C, is 65% or more and 80% or less of the carcass half width W1, for example. A fourth belt half width (Wd), which is the belt half width of the fourth belt ply 7D, is 50% or more and 70% or less of the carcass half width W1, for example. However, the present disclosure is not limited to such an embodiment.

As shown in FIG. 1, in the present embodiment, since the belt layer 7 has the above-described configuration, sufficient reinforcing effect is exerted, therefore, it is possible that the outer diameter growth of the tread portion 2 is surely suppressed. Therefore, the tread portion 2 in the present embodiment has only the belt layer 7 as a reinforcing member, and no other reinforcing members (e.g., a band layer having cords spirally wound, and the like) are provided therein. As a result, the weight increase of the tread portion 2 is suppressed, therefore, it is possible that the rolling resistance is maintained small.

As shown in FIG. 2, the distance L1 in the tire axial direction from the tire equator (C) to the groove center of each of the pair of shoulder circumferential grooves 12 is preferably 40% or more, more preferably 45% or more, and preferably 60% or less, more preferably 55% or less of the carcass half width W1 (shown in FIG. 3, and the same applies hereinafter). Therefore, it is possible that the shoulder circumferential grooves 12 exert excellent drainage performance.

The maximum groove width of each of the shoulder circumferential grooves 12 is, for example, 6.0 mm or more and 16.0 mm or less, preferably 8.0 mm or more and 14.0 mm or less. It is possible that the shoulder circumferential grooves 12 configured as such exert excellent drainage performance as wide grooves while suppressing an increase in the rolling resistance.

A distance L2 in the tire axial direction from the tire equator (C) to a groove center of each of the pair of the crown circumferential grooves 11 is preferably 10% or more and 20% or less of the carcass half width W1. As a result, it is possible that the wet performance is improved while uneven wear is suppressed in the central portion of the tread portion 2.

The maximum groove width of each of the crown circumferential grooves 11 is, for example, 1.0 mm or more and 3.0 mm or less, and preferably 1.5 mm or more and 2.5 mm or less. It is possible that the crown circumferential grooves 11 configured as such exert excellent drainage performance as narrow grooves while suppressing an increase in the rolling resistance.

Figure 4:
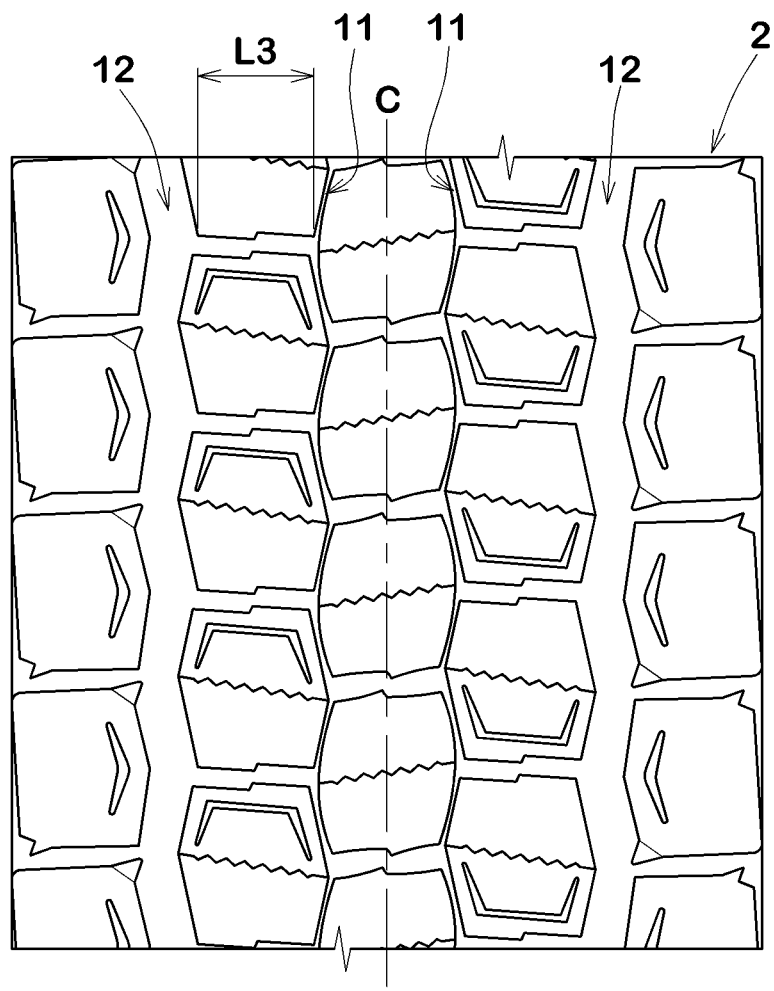
FIG. 4 is a plan view of the tread portion of FIG. 1.

FIG. 4 shows a plan view of the tread portion 2. As shown in FIG. 4, it is preferred that each of the shoulder circumferential grooves 12 and the crown circumferential grooves 11 extends in a zigzag manner. The shoulder circumferential grooves 12 and crown circumferential grooves 11 configured as such are helpful for improving traction performance during wet running.

In a more preferred embodiment, a minimum distance L3 in the tire axial direction between one of the shoulder circumferential grooves 12 extending in a zigzag manner and one of the crown circumferential grooves 11 adjacent thereto and extending in a zigzag manner is larger than a maximum distance L4 (shown in FIG. 2) between the adjacent outer ends of the belt plies included in the belt layer 7. Therefore, a sufficient distance is secured between each of the crown circumferential grooves 11 and one of the shoulder circumferential grooves 12 adjacent thereto, thereby, the uneven wear resistance performance is further improved.

Further, it is preferred that an amplitude amount in the tire axial direction of a groove center line of each of the crown circumferential grooves 11 in the tread plan view is smaller than a distance (d1) (shown in FIG. 2) in the tire radial direction from the bottom of each of the crown circumferential grooves 11 to the belt layer 7. Similarly, it is preferred that an amplitude amount in the tire axial direction of a groove center line of each of the shoulder circumferential grooves 12 in the tread plan view is larger than a distance (d2) (shown in FIG. 2) in the tire radial direction from the bottom of each of the shoulder circumferential grooves 12 to the belt layer 7. As a result, it is possible that the shoulder circumferential grooves 12 exert excellent drainage performance while suppressing the uneven wear around the crown circumferential grooves 11.

The tread portion 2 of the present embodiment is provided with only two shoulder circumferential grooves 12 and two crown circumferential grooves 11 and is not provided with other circumferential grooves. Therefore, the above-described effects are reliably exerted.

While detailed description has been made of the pneumatic tire for heavy duty according to an embodiment of the present disclosure, the present disclosure can be embodied in various forms without being limited to the illustrated embodiment.

EXAMPLES

Pneumatic tires for heavy duty of size 295/60R22.5 having the basic structure of FIG. 1 were made by way of test according to the specifications listed in Tables 1 and 2.

Reference 1 being 100, wherein the smaller the numerical value, the smaller the rolling resistance is.

<Wet Performance>

The braking distance was measured when a test vehicle with the test tires mounted thereon entered a wet road surface at 60 km/h and braked suddenly. The results are indicated by an index based on the braking distance of Reference 1 being 100, wherein the smaller the numerical value, the better the wet performance is.

<Uneven Wear Resistance Performance>

The amount of wear on the tread was measured after a test vehicle with the test tires mounted thereon was driven for a certain distance in an urban area.

The results are indicated by an index based on Reference 1 being 100 for the difference between the amount of wear of the portion with the largest wear of the tread portion and the amount of wear of the portion with the least wear of the tread portion.

The smaller the numerical value, the better the uneven wear resistance performance is.

The test results are shown in Tables 1 and 2.

TABLE 1

|  |  | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|---|
| Groove width of Crown circumferential groove | [mm] | 10.0 | 2.0 | 2.0 | 2.0 | 2.0 | 2.0 | 2.0 | 2.0 | 2.0 | 2.0 |
| Gross width Shoulder circumferential groove | [mm] | 10.0 | 10.0 | 10.0 | 10.0 | 10.0 | 10.0 | 10.0 | 10.0 | 10.0 | 10.0 |
| Belt halfwidth W2/Carcass half width W1 | [%] | 79 | 50 | 90 | 79 | 55 | 60 | 65 | 70 | 75 | 85 |
| Distance L1 from Tire equator to Shoulder circumferential groove/Carcass half width W1 | [%] | 50 | 50 | 50 | 50 | 50 | 50 | 50 | 50 | 50 | 50 |
| Rolling resistance | [index] | 100 | 97 | 95 | 93 | 96 | 95 | 95 | 94 | 93 | 100 |
| Wet performance | [index] | 100 | 104 | 103 | 100 | 103 | 102 | 101 | 100 | 100 | 101 |
| Uneven wear resistance performance | [index] | 100 | 105 | 99 | 94 | 99 | 98 | 96 | 95 | 95 | 96 |

TABLE 2

|  |  | Ex. 8 | Ex. 9 | Ex. 10 | Ex. 11 | Ex. 12 | Ex. 13 | Ex. 14 | Ex. 15 |
|---|---|---|---|---|---|---|---|---|---|
| Groove width of Crown circumferential groove | [mm] | 2.0 | 2.0 | 2.0 | 2.0 | 1.0 | 3.0 | 2.0 | 2.0 |
| Groove width Shoulder circumferential groove | [mm | 10.0 | 10.0 | 10.0 | 10.0 | 10.0 | 10.0 | 6.0 | 16.0 |
| Belt half width W2/Carcass half with W1 | [%] | 79 | 79 | 79 | 79 | 79 | 79 | 79 | 79 |
| Distance L1 from Tire equator to Shoulder circumferential groove/Carcass half width W1 | [%] | 40 | 45 | 55 | 60 | 50 | 50 | 50 | 50 |
| Rolling resistance | [index] | 96 | 95 | 93 | 91 | 93 | 93 | 93 | 93 |
| Wet performance | [index] | 100 | 100 | 100 | 102 | 100 | 100 | 100 | 100 |
| Uneven wear resistance performance | [index] | 97 | 96 | 94 | 94 | 94 | 94 | 94 | 94 |

As Reference 1, tires in which each of the crown circumferential grooves 11 was formed as a wide groove having the groove width of 10 mm were made by way of test. As References 2 and 3, tires having the belt half width outside the range specified in the present disclosure were made by way of test. Each of the test tires has substantially the same configuration, except for the specifications given in Tables 1 and 2. Each of the test tires was tested for the rolling resistance, the wet performance, and the uneven wear resistance performance. Common specifications of the test tires and the test methods were as follows.

Tire mounting rim: 9.00×22.5
Tire inner pressure: 1000 kPa
<Rolling Resistance>

The rolling resistance of the test tires was measured while the test tires were run on a drum testing machine under a constant vertical load and at a constant speed. The results are indicated by an index based on the rolling resistance of From the test results, it was confirmed that the tires in Examples improved the uneven wear resistance performance without sacrificing the rolling resistance and the wet performance.

Statement of Disclosure

The present disclosure includes the following aspects.

[Present Disclosure 1]

A pneumatic tire for heavy duty having an aspect ratio of 65% or less including:

a tread portion;

a pair of bead portions;

a carcass extending from one of the bead portions to the other one of the bead portions via the tread portion; and a belt layer arranged inside the tread portion, wherein
the tread portion includes a plurality of circumferential grooves extending continuously in a tire circumferential direction,
the circumferential grooves include a pair of shoulder circumferential grooves and at least one crown circumferential groove arranged between the shoulder circumferential grooves,
the crown circumferential groove is a narrow groove that closes when contacting the ground under a condition of being loaded with a maximum tire load,
each of the shoulder circumferential grooves is a wide groove that does not close when contacting the ground under the condition of being loaded with the maximum tire load,
the belt layer includes a plurality of belt cords made of metal and arranged obliquely with respect to the tire circumferential direction,
a pair of outer ends in a tire axial direction of the belt layer are each positioned axially outside a respective one of the shoulder circumferential grooves,
a belt half width from a tire equator to one of the outer ends of the belt layer is 55% or more and 85% or less of a carcass half width, the carcass half width being a distance in the tire axial direction from the tire equator to the carcass at a maximum tire width position in an axial half of the tire.

[Present Disclosure 2]
The pneumatic tire for heavy duty according to present disclosure 1, wherein a distance in the tire axial direction from the tire equator to a groove center of each of the shoulder circumferential grooves is 40% or more and 60% or less of the carcass half width.

[Present Disclosure 3]
The pneumatic tire for heavy duty according to present disclosure 1 or 2, wherein two crown circumferential grooves are provided between the shoulder circumferential grooves.

[Present Disclosure 4]
The pneumatic tire for heavy duty according to any one of present disclosures 1 to 3, wherein
the belt layer incudes a plurality of belt plies overlaid in a tire radial direction,
in each of the belt plies, the belt cords are arranged obliquely to the same side with respect to the tire circumferential direction, and
at least one pair of the belt plies adjacent to each other in the tire radial direction are overlaid so that the belt cords of one of the belt plies of the pair intersect with the belt cords of the other one of the belt plies of the pair.

[Present Disclosure 5]
The pneumatic tire for heavy duty according to any one of present disclosures 1 to 4, wherein
the belt plies include a first belt ply, a second belt ply, a third belt ply, and a fourth belt ply layered in this order from inside to outside in the tire radial direction, and
the belt cords included in the first belt ply have an angle with respect to the tire circumferential direction larger than each of angles of the belt cords included in the second to fourth belt plies with respect to the tire circumferential direction.

[Present Disclosure 6]
The pneumatic tire for heavy duty according to present disclosure 5, wherein the belt cords included in the second to fourth belt plies are arranged at the angle of 10 degrees or more and 25 degrees or less with respect to the tire circumferential direction.

[Present Disclosure 7]
The pneumatic tire for heavy duty according to present disclosure 5 or 6, wherein the belt cords included in the first belt ply are arranged at the angle of 40 degrees or more and 60 degrees or less with respect to the tire circumferential direction.

[Present Disclosure 8]
The pneumatic tire for heavy duty according to any one of present disclosures 5 to 7, wherein in each of the second to fourth pelt plies, a ply half width from the tire equator to each of ply outer ends in the tire axial direction is 110% or more and 170% or less of a distance in the tire axial direction from the tire equator to a groove center of each of the shoulder circumferential grooves.

DESCRIPTION OF REFERENCE SIGNS 2 tread portion
4 bead portion
6 carcass
7 belt layer
10 circumferential groove
11 crown circumferential groove
12 shoulder circumferential groove
W1 carcass half width
W2 belt half width

The invention claimed is:
1. A pneumatic tire for heavy duty having an aspect ratio of 65% or less comprising:
a tread portion;
a pair of bead portions;
a carcass extending from one of the bead portions to the other one of the bead portions via the tread portion; and
a belt layer arranged inside the tread portion,
wherein
the tread portion includes a plurality of circumferential grooves extending continuously in a tire circumferential direction,
the circumferential grooves include a pair of shoulder circumferential grooves and at least one crown circumferential groove arranged between the shoulder circumferential grooves,
the crown circumferential groove is a narrow groove that closes when contacting the ground under a condition of being loaded with a maximum tire load,
each of the shoulder circumferential grooves is a wide groove that does not close when contacting the ground under the condition of being loaded with the maximum tire load,
the belt layer includes a plurality of belt cords made of metal and arranged obliquely with respect to the tire circumferential direction,
a pair of outer ends in a tire axial direction of the belt layer are each positioned axially outside a respective one of the shoulder circumferential grooves,
a belt half width from a tire equator to one of the outer ends of the belt layer is 55% or more and 85% or less of a carcass half width, the carcass half width being a distance in the tire axial direction from the tire equator to the carcass at a maximum tire width position in an axial half of the tire,
wherein the belt layer incudes a plurality of belt plies overlaid in a tire radial direction,
in each of the belt plies, the belt cords are arranged obliquely to the same side with respect to the tire circumferential direction,
at least one pair of the belt plies adjacent to each other in the tire radial direction are overlaid so that the belt cords of one of the belt plies of the pair intersect with the belt cords of the other one of the belt plies of the pair,
wherein each of the shoulder circumferential grooves and the or each crown circumferential groove extend in a zigzag manner,
a minimum distance (L3) in the tire axial direction between one of the shoulder circumferential grooves and the crown circumferential groove or one of the crown circumferential grooves adjacent thereto is larger than a maximum distance (L4) between adjacent outer ends of the belt plies included in the belt layer,
wherein an amplitude in the tire axial direction of a groove center line of the or each zigzag shaped crown circumferential groove in the tread plan view is smaller than a distance (d1) in the tire radial direction from the bottom of the or each crown circumferential groove to the belt layer,
wherein an amplitude in the tire axial direction of a groove center line of each of the zigzag shaped shoulder circumferential grooves in the tread plan view is larger than a distance (d2) in the tire radial direction from the bottom of each of the shoulder circumferential grooves to the belt layer, and
in a pair of the or each crown circumferential groove and one of the shoulder circumferential grooves adjacent thereto, zigzag phases of the or each crown circumferential groove and the one of the shoulder circumferential grooves are opposite to each other.

2. The pneumatic tire for heavy duty according to claim 1, wherein a distance in the tire axial direction from the tire equator to a groove center of each of the shoulder circumferential grooves is 40% or more and 60% or less of the carcass half width.

3. The pneumatic tire for heavy duty according to claim 1, wherein the belt half width is 60% or more and 80% or less of the carcass half width.

4. The pneumatic tire for heavy duty according to claim 1, wherein the tread portion has only the belt layer as a reinforcing member and no other reinforcing members are provided therein.

5. The pneumatic tire for heavy duty according to claim 1, wherein
the belt layer consists of a first belt ply, a second belt ply, a third belt ply, and a fourth belt ply directly layered in this order from inside to outside in the tire radial direction,
each of the first to fourth belt plies includes the belt cords made of metal and arranged obliquely with respect to the tire circumferential direction,
the belt cords included in the first belt ply have an angle with respect to the tire circumferential direction larger than each of angles of the belt cords included in the second to fourth belt plies with respect to the tire circumferential direction,
the fourth belt ply has a width in the tire axial direction smaller than each of widths in the tire axial direction of the first, the second, and the third belt plies,
the tread portion has only the belt layer as a reinforcing member and no other reinforcing members are provided therein,
each of the shoulder circumferential grooves and the or each crown circumferential groove extend in a zigzag manner,
in a pair of the or each crown circumferential groove and one of the shoulder circumferential grooves adjacent thereto, zigzag phases of the or each crown circumferential groove and the one of the shoulder circumferential grooves are opposite to each other, and
a minimum distance (L3) in the tire axial direction from the or each crown circumferential groove to one of the shoulder circumferential grooves adjacent thereto in a plan view of the tread portion is larger than a maximum distance (L4) in the tire axial direction between outer ends of the belt plies included in the belt layer in a half of the tire divided by the tire equator.

6. The pneumatic tire for heavy duty according to claim 1, wherein two crown circumferential grooves are provided between the shoulder circumferential grooves.

7. The pneumatic tire for heavy duty according to claim 6, wherein
the two crown circumferential grooves are arranged between the shoulder circumferential grooves so as to sandwich the tire equator, and
a distance in the tire axial direction from the tire equator to a groove center of each of the crown circumferential grooves is 10% or more and 20% or less of the carcass half width.

8. The pneumatic tire for heavy duty according to claim 1, wherein each of the shoulder circumferential grooves has a maximum groove width of 6.0 mm or more and 16.0 mm or less.

9. The pneumatic tire for heavy duty according to claim 8, wherein the or each crown circumferential groove has a maximum groove width of 1.0 mm or more and 3.0 mm or less.

10. The pneumatic tire for heavy duty according to claim 1, wherein
the belt plies include a first belt ply, a second belt ply, a third belt ply, and a fourth belt ply layered in this order from inside to outside in the tire radial direction, and
the belt cords included in the first belt ply have an angle with respect to the tire circumferential direction larger than each of angles of the belt cords included in the second to fourth belt plies with respect to the tire circumferential direction.

11. The pneumatic tire for heavy duty according to claim 10, wherein the belt cords included in the second to fourth belt plies are arranged at the angle of 10 degrees or more and 25 degrees or less with respect to the tire circumferential direction.

12. The pneumatic tire for heavy duty according to claim 10, wherein the belt cords included in the first belt ply are arranged at the angle of 40 degrees or more and 60 degrees or less with respect to the tire circumferential direction.

13. The pneumatic tire for heavy duty according to claim 10, wherein in each of the second to fourth pelt plies, a ply half width from the tire equator to each of ply outer ends in the tire axial direction is 110% or more and 170% or less of a distance in the tire axial direction from the tire equator to a groove center of each of the shoulder circumferential grooves.

14. The pneumatic tire for heavy duty according to claim 10, wherein
the first belt ply has a first belt half width as the belt half width thereof, and
the first belt half width is 65% or more and 80% or less of the carcass half width.

15. The pneumatic tire for heavy duty according to claim 14, wherein
the second belt ply has a second belt half width as the belt half width thereof, and
the second belt half width is 75% or more and 85% or less of the carcass half width.

16. The pneumatic tire for heavy duty according to claim 15, wherein
    the third belt ply has a third belt half width as the belt half width thereof, and
    the third belt half width is 65% or more and 80% or less of the carcass half width.

17. The pneumatic tire for heavy duty according to claim 16, wherein
    the fourth belt ply has a fourth belt half width as the belt half width thereof, and
    the fourth belt half width is 50% or more and 70% or less of the carcass half width.

* * * * *